United States Patent [19]

Clelford et al.

[11] 4,355,358
[45] Oct. 19, 1982

[54] ADAPTIVE AIRCRAFT ACTUATOR FAULT DETECTION

[75] Inventors: Douglas H. Clelford, Trumbull; Donald W. Fowler, West Haven, both of Conn.

[73] Assignee: United Technologies Corporation, Hartford, Conn.

[21] Appl. No.: 181,510

[22] Filed: Aug. 26, 1980

[51] Int. Cl.³ .................. G06F 15/50; G06G 7/78
[52] U.S. Cl. .................. 364/424; 244/17.13; 244/195; 364/150; 364/151
[58] Field of Search ............... 364/105, 106, 424, 434, 364/150, 151; 244/17.13, 194, 195, 196

[56] References Cited

U.S. PATENT DOCUMENTS

| | | | |
|---|---|---|---|
| 4,148,452 | 4/1979 | Niessen et al. | 244/195 |
| 4,206,891 | 6/1980 | Perez et al. | 244/17.13 |
| 4,213,175 | 7/1980 | Kurihara | 364/106 X |
| 4,249,238 | 2/1981 | Spang et al. | 364/106 |

Primary Examiner—Jerry Smith
Attorney, Agent, or Firm—M. P. Williams

[57] ABSTRACT

The operation of an actuator (16) is monitored by comparing its position (21) with the position (31, 136) indicated by a model which integrates (45, 135) a limited amount of the difference between the position command (24) applied to the actuator and the achieved model position (31, 136), the limited amount being variable (63, 67, 124) from a nominal limit (61, 65, 124) in dependence upon limited functions (74, 90, 114, 116) of the difference (33, 109) between the actuator position and the model position, and additionally reduced (80, 94, 122) when pilot input overrides (50, 108) the position of the actuator.

2 Claims, 4 Drawing Figures

FIG.3

ADAPTIVE AIRCRAFT ACTUATOR FAULT DETECTION

The Government has rights in this invention pursuant to Contract No. N00019-77-C-0202 awarded by the Department of the Navy.

DESCRIPTION

Technical Field

This invention relates to helicopter automatic flight controls, and more particularly to actuator fault detection which is adaptive with respect to actuator operating conditions.

BACKGROUND ART

In many sophisticated aircraft, such as helicopters, which are used herein by way of example, there are a variety of hydraulic and electromechanical actuators used for various purposes in the systems which position the control surfaces, thereby to maneuver the aircraft. For instance, in helicopters, it is common to employ a trim actuator which controls the position of a spring detent trim position of the mechanical mechanism that interconnects the pilot control element (such as pedals that control the tail rotor blade pitch for maneuvering in the yaw axis, the cyclic pitch stick which controls main rotor blade switch for maneuvering in the pitch and roll axis, or the collective stick which controls lift). Such actuators operate in response to a position command signal, the actuator driving the trim position until a position detector determines that the trim position is equal to the position command being applied. Of course, if continuously varying position commands are applied, the actuator will continuously slew the trim position in an attempt to catch up. However, any actuator, whether hydraulic or electromechanical, has a certain inherent driving rate, dependent upon the overall gain of the servo loop and the characteristics of the actuator.

In order to detect faults in the actuator, it has been known to provide an electric approximation of the actuator servo loop (referred to hereinafter as a model), apply the same position commands to the model as are applied to the actuator servo loop, and compare the trim position achieved by the actuator with a position determined by the model to be that which the actuator should achieve. Deviations in the two positions are indicative, in simply theory, of actuator servo loop failure. The problem with this simple theory is that all actuators have not only an inherent Lag (that is to say, the time at which the actuator achieves a certain trim position being delayed from the time that a command for that position is applied thereto), but also have variations in such lags. Thus, a hydraulic actuator loop may have variations in lag due to hydraulic pressure and temperature, and the like. Additionally, no two actuators will be exactly alike. Severe loading of hydraulic actuators can slow down their response. And, electromechanical actuators are very load dependent, and any variation in the loading thereof tends to vary the rate of response.

Furthermore, when the particular actuator involved is one which drives a resilient trim position, the pilot can override the trim position by forcing his control (such as a stick or pedals), and in fact increase the loading of the actuator to the point where it may stall completely and never reach the intended trim position.

In an attempt to overcome these difficulties, actuator fault detection systems known to the prior art have provided a rate limit on the position command signal which is applied both to the actuator and to the model. The rate limit is chosen so as to limit the rate at which commanded positions can change to a rate which is below the minimum rate of response (maximum lag) for all reasonable circumstances applicable to a given type of actuator. Thus, in theory, the actuator should always be able to follow the limited-rate input command, and therefore the model need simply integrate that command at a suitable scale factor in order to determine exactly where the trim position should be. However, this severely limits the speed of response of the actuator servo loop itself, thereby degrading aircraft performance. On the other hand, if the input command is less severely rate limited, then actually permissible lags in excess thereof will cause false indications of fault (nuisance faults). This in turn reduces pilot confidence in the system and requires pilot workload in order to determine that only nuisance faults are involved.

In the case of trim actuators, whenever the pilot moves his control it applies forces against the trim position, which are reflected back to the actuator. In order to avoid nuisance faults in such cases, the fault detection has been inhibited during the application of force by the pilot. However, in this circumstance, there is a risk that a real actuator fault will occur, the pilot will override the run-away actuator, and the fault is ignored at a precise time when it should be sensed.

Disclosure of Invention

Objects of the invention include provision of aircraft control actuator fault detection which does not mask failures during pilot override, which does not promote creation of nuisance fault indications, which does not degrade actuator performance, and is adaptable for use with a wide variety of actuators.

According to the present invention, the position achieved by an aircraft control actuator servo loop in response to a position command signal is compared with the position indication signal of an actuator loop model which is fed by the same position command signal, the model including variable rate limiting as a function of the degree to which the actuator leads or lags the model and further dependent on whether pilot inputs are loading the actuator above a threshold amount.

In accordance further with the invention, the model includes a feedback loop having integral gain of the variably rate limited feedback error.

The present invention can be implemented in analog or digital form, and may in fact be implemented with a suitably programmed digital computer. The invention is easily adapted to a wide variety of actuators of various types and functions. The invention provides a maximal actuator confidence with a minimum impact on system performance. The invention may be implemented utilizing apparatus and techniques which are well known in the art, in the light of the detailed teachings which follow hereinafter.

The foregoing and other objects, features and advantages of the present invention should become more apparent in the light of the following detailed description of exemplary embodiments thereof, as illustrated in the accompanying drawings.

BEST MODE FOR CARRYING OUT THE INVENTION

Figure 1:
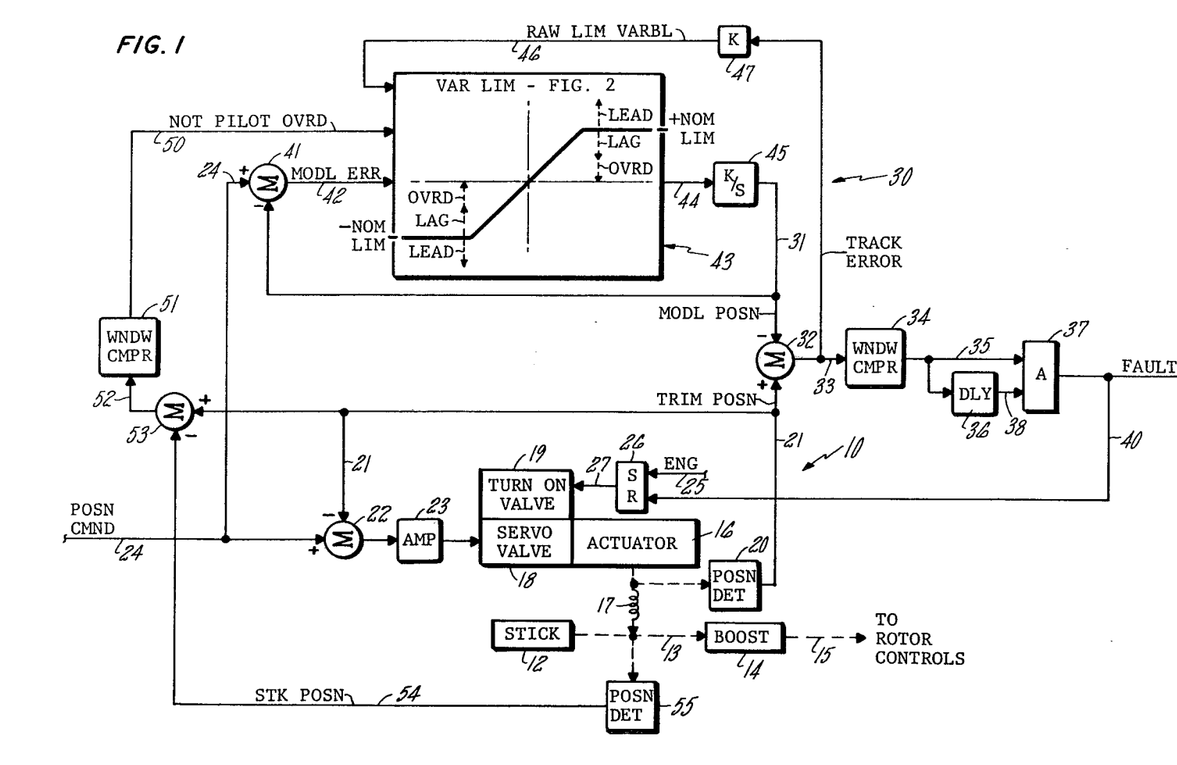
FIG. 1 is a simplified schematic block diagram of an actuator system employing the present invention.

In the exemplary embodiment illustrated in FIG. 1, an aircraft control actuator system comprises a helicopter trim actuator servo loop 10 of the type having a pilot control stick 12 connected by mechanical linkage 13 to a booster servo 14, operable in response to a source of hydraulic pressure (not shown) to boost the mechanical input provided by the linkage 13 so as to move mechanical linkage 15 that controls the pitch of rotor blades, in dependence upon the particular attitude axis of the helicopter which the related motion of this stick 12 dominates. For instance, the stick 12 may typically comprise the cyclic pitch stick and therefore relate to the longitudinal cyclic pitch of the main rotor, or to the lateral cyclic pitch of the main rotor; on the other hand, that represented herein as the stick 12 may comprise a collective pitch stick, or pedals which control the pitch of the tail rotor blades, thereby orienting the aircraft with respect to its yaw axis.

As depicted in a simple, illustrative fashion herein, the linkage 13 is resiliently connected to a trim actuator 16, as represented illustratively by a spring 17 in FIG. 1. Depending upon the positioning of the actuator 16 (which may comprise a hydraulic piston positionable by hydraulic pressure from a source (not shown) in dependence on an electric signal applied to a servo valve 18 whenever the valve 18 is connected to the hydraulic source by a turn-on valve 19. Positioning of the piston within the actuator 16 (such as either to the right or to the left as illustrated in FIG. 1) will alter the position of the linkage 13 which will have a neutral force applied to it by the spring 17. That position is referred to herein as the trim position. If the aircraft is operating in response to an automatic flight control system, and the pilot is not applying force to the stick, the actuator 16 through its resilient connection 17 will position the mechanical linkage 13 for amplification by the boost servo 14 thereby to position the rotor control. However, the pilot can override the automated system by applying a suitable force to overcome the resilient actuator input on the linkage 13, the force being dependent upon the degree of override which is required.

The actual trim position is sensed by a position detector 20, which may comprise a potentiometer or an LVDT, to provide a trim position signal on a line 21. The trim position signal on the line 21 is fed back to a summing junction 22, which may comprise the input to an amplifier 23, for subtraction from a position command signal on a line 24. The amplifier 23 drives the servo valve 18 so as to cause the actuator to move to a desired trim position. The position command signal on the line 24 is generated by an autopilot system, with or without stability augmentation signals included therein, so as to control helicopter flight automatically when the system is engaged, such as by a signal on a line 25 setting a bistable device 26 that provide a signal on a line 27 to operate the turn-on valve 19. The description thus far is of a typical helicopter trim actuator servo loop, similar to a yaw trim actuator described in commonly owned U.S. Pat. No. 4,206,891.

In accordance with the invention, an adaptive actuator model 30 provides a model position signal on a line 31 for substraction from the trim position signal on the line 21 by a summing junction 32 to provide a track error signal on a line 33. The track error signal on the line 33 may be applied to a window comparator to determine if its absolute value exceeds ± threshold values provided by references voltages in a window comparator 34, a signal will be applied directly on a line 35 and through a delay circuit 36 to an AND circuit 37. If the signal exists on the line 35 throughout the period of the delay circuit 36, the output of the delay circuit 36 on the line 38 will be present at the input contemporaneously with the signal on the line 35. In this case, the AND circuit 37 will generate a fault signal on a line 40. The use of the delay circuit 36 and the AND circuit 37 ensures that no fault will be indicated unless the track error is excessive for some period of time, such as 250 milliseconds, thereby avoiding creation of nuisance fault indications as a result of noise, and also allowing the actuator motion (though not necessarily its position) to stabilize before sensing any errors. Thus, slow response due to initial friction and the like will not create nuisance faults.

The model 30 responds to the difference between the position command signal on the line 24 and the model position signal on the line 31 as provided by a summing junction 41. This provides a model error signal on a line 42 which is passed through a variable limit circuit 43, described in detail hereinafter with respect to FIG. 2, the output of which is applied on a line 44 to an integrating amplifier 45 that generates the model position signal on the line 31. The integrating amplifier on the line 45 provides an integration of position error in a fashion analogous to the actual motion of the actuator 16, which provides such integration across time. In addition to the model error signal on the line 42, the variable limit circuit 43 responds to a raw limit variable signal on a line 46 which is provided by an amplifier 47 that suitably scales (as described hereinafter) the track error signal on the line 33. It is the use of a derivative of the track error signal on the line 33 that causes the actuator fault detection of the present invention to be adaptive: that is, it is dependent upon the track error sensed as the difference between the actual trim position and the expected trim position (model position) that controls the generation of the model position. The variable limit circuit 43 is also responsive to a not pilot override signal on a line 50 which is generated by a window comparator 51 whenever a position difference signal on a line 52 is in excess of a predetermined magnitude, in either direction, established by suitable reference voltages within the widow comparator 51. The signal on the line 52 is the difference, provided by a summing junction 53, between the trim position signal on the line 21 and a stick position signal on the line 54 from a position detector 55 that detects the position of the mechanical linkage 13. The difference in the signals on the lines 21 and 54 is therefore an indication of the difference between the linkage trim position and the actual linkage position, and indicates the degree of override by pilot motion of the stick 12 which is being manifested. The window comparator 51 may be set to establish the not pilot override signal on the line 50 so long as the difference in the signals on the lines 21 and 54 represent less than about two pounds of force on the control stick 12. On the other hand, if the actuator system with which the invention is to be utilized relates to the yaw axis of a helicopter, the not pilot override signal on the line 50 could simply be generated whenever the pedal release switches are closed, indicating that the pilot is not attempting to move the pedals against the trim position.

In general, the variable limit circuitry 43 provides a limit to the magnitude of the model error signal on the line 42 before it is applied on the line 44 to the integrating amplifier 45. In the general case, such as when the actuator is at a desired position which agrees with the model position, the variable limiter 43 will have nominal limits in which the plus and minus directions. These limits may be equivalent to actuator motion rates of, for instance, ±10% of full stick authority per second. This rate is chosen to equal the nominal rate of motion of the actuator 16. In the case of trim actuators capable of exercising full authority, such as when driven by autopilot signals, the rate at which the actuator can exercise authority is normally limited to be within the range of 10–20% of full authority per second. This avoids any tendency for catastrophic, hardover operation of the controls as a result of erroneous electrical position command signals.

The variable limit circuit 42 is adaptive, however, in accordance with the invention, because the nominal rate limits are adjusted in a continuously variable fashion in dependence on the magnitude of the track error signal on the line 33. Thus, if the actuator is travelling faster than the model because of very light loading, the actuator is thus leading the model, so the limits on the model error signal may be increased (relaxed) to allow the model to represent a faster actuator and therefore more closely follow the operation of the real actuator.

In general, if the track error signal on the line 32 is zero, the variable limit circuit 43 will have nominal limit values. Therefore, when the model is tracking the actuator exactly, in response to continuously changing position command signals on the line 24, the model error signal on the line 42 (which will be finite due to the variation in the input command) will pass through the circuit 43 intact, unless it is either more positive than the positive nominal limit or more negative than the negative nominal limit. But when, as is the usual case, the model and the actuator are not tracking perfectly, there will be a finite track error signal on the line 33. If this signal is positive and the position command signal is commanding a more positive position, this indicates that the actuator is operating under an extremely light load and therefore at a rate faster than the nominal rate of the model. Therefore, the variable limit circuitry 43 will provide higher limits than nominal for the model error signal. In the case of increasingly positive commands, the model error signal will always be positive, and therefore the positive side of the limiter will be effective. On the other hand, if the track error signal 33 is negative in such case, this would be indicative of heavier loading of the actuator so that it is operating at a slower rate than the model rate, and this negative signal will cause the variable limit circuitry 43 to more severely limit (with a lower limit value) the positive model error signals being passed therethrough. Thus, depending upon the direction of the position command itself (for an increasing position or a decreasing position in comparison with the current position of the trim actuator and the model) positive track errors will indicate a faster actuator rate and cause a higher limit whereas negative track errors will indicate a slower actuator rate and cause a lower rate limit in the model. But if the position commands are increasingly negative, then negative track errors indicate that the actuator is operating at a faster rate (less load) and therefore is leading the model, and cause an increase in the permissible rate within the model.

Figure 2:
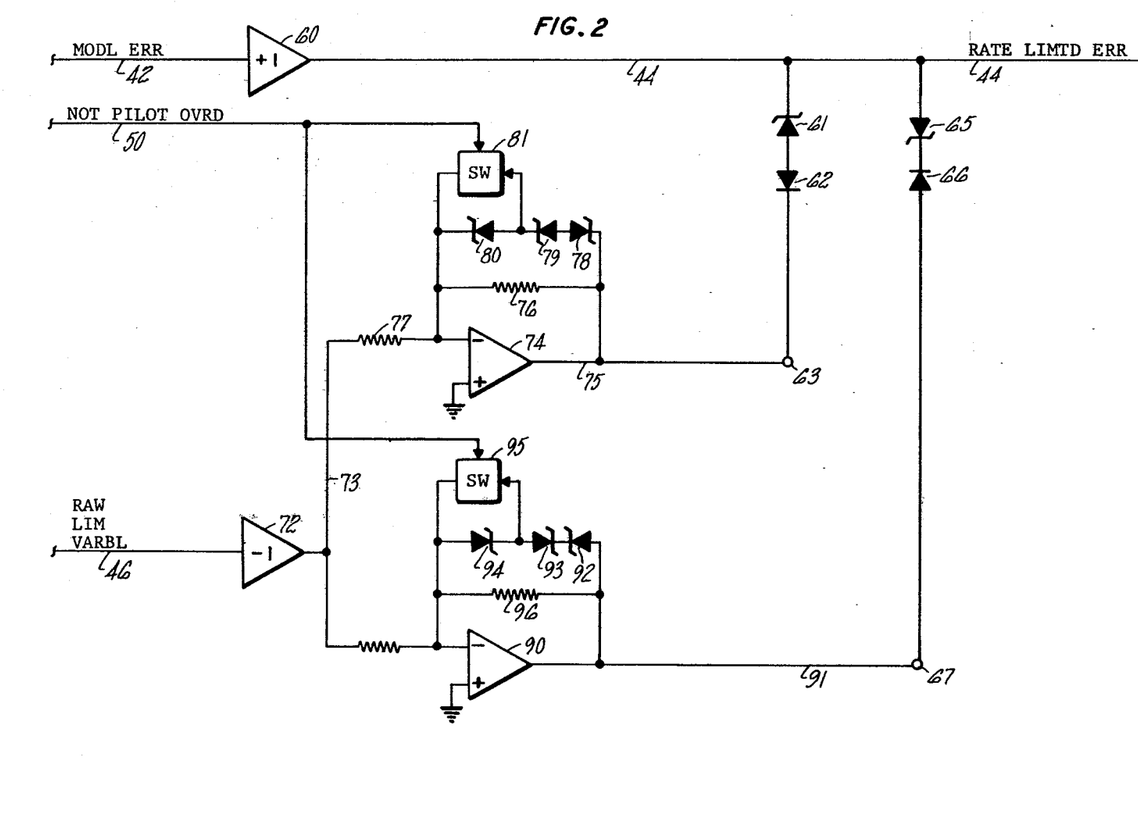
FIG. 2 is a schematic diagram of exemplary variable limit circuit for use in the embodiment of the invention illustrated in FIG. 1.

An exemplary circuit (which is not per se part of the invention herein) for implementing the variable limit circuitry portion of the present invention is illustrated in FIG. 2. Therein, the model error signal on the line 42 is passed through an isolation amplifier 60, which for simplicity in the following description is assumed to be a non-inverting amplifier. The output of the amplifier 60 is connected with limit circuitry so that it provides the rate limited error signal on the line 44. Consider first the situation where the track error signal on the line 33 is zero so that only nominal limits are provided. The positive nominal limit is provided by a Zener diode 61 in series with a unilateral impedance such as a diode 62 which is connected to a reference potential at a point 63. When the track error signal on the line 33 is zero, the reference pilot 63 is at ground zero potential. The Zener diode is chosen to have a reverse conduction voltage that is representative of the desired nominal limit, such as the voltage at the signal line 44 will have when it represents a position rate of about 10% of full authority per second. Thus with the reference point 63 at ground or zero potential, the signal line 44 will have the positive nominal limit applied to it. Similarly, signals in the negative direction are provided a suitable negative nominal limit by a Zener diode 65, which may be the same as the Zener diode 61 but poled in the opposite direction, in series with a unilateral impedance such as a diode 66 connected to a reference point 67. In a similar fashion, with no track error signal on the line 33, the reference point 67 is at zero or ground potential so that the rate limited error signal on the line 44 will be limited to equal an actuator rate on the order of −10% of full authority per second.

The variable limit is achieved by adjusting the potentials of the reference points 63, 67. These points are adjusted as a function of the raw limit variable signal on the line 46 (which is just a scaled function of the track error signal on the line 33, FIG. 1). Assume for the time being that the track error signal is positive at a time when the actuator is being driven to increasingly positive positions. As described hereinbefore, if the position command signals on the line 24 (FIG. 1) are commanding increasingly positive positions, the model error signal on the line 42 will be positive. The raw limit variable signal on the line 46 is a function of the track error signal, and assuming no other inversions, will be positive since the actuator is leading the model (with a light load) and therefore the nominal limit should be increased, it is necessary to raise the potential of the reference point 63. The raw limit variable signal on the line 46 is passed through an inverting amplifier 72 so as to provide a negative version thereof on a line 73 which is applied to the negative input of a feedback amplifier 74, causing the output thereof on a line 75 to become more positive than ground. The positive signal is fed back through a feedback resistor 76, which may be chosen to have the same value as an input resistor 77 so as to have a gain of unity. However, if the signal on the line 75 exceeds the reverse conduction voltage of a Zener diode 78, the voltage on line 75 will be clamped at that voltage. The threshold voltage of the Zener diode 78 may be taken to be that fraction of the threshold voltage of the Zener diode 61 by which the permissible lead in the variable limit in a positive direction is desired, compared to the nominal limit. For instance, assuming a nominal limit of 10% of authority per second and a design goal of allowing this nominal limit to be as high at 15% of authority per second, the Zener diode 61 may have a breakdown voltage which is twice that of the Zener diode 78. When this threshold is reached, two additional Zener diodes 79, 80 in series with the Zener diode 78 will be forward biased, and therefore they and/or a switch 81 will conduct. Thus, the feedback is limited to the voltage established by the Zener diode 78 and hence controls the amount by which the potential at the reference point 63 can be raised, which also causes the voltage on the line 44 to be raised a commensurate amount before causing reverse conduction of the Zener diode 61. Depending upon the magnitude of the raw limit variable signal on the line 46, the reference point 63 can raise in its potential any amount up to and including the breakdown potential of the Zener diode 78, after which it cannot raise any higher. This provides a positive increase in the limit to account for the actuator leading the model when both the track error signal and the model error signal are positive (indicating an increasing position command signal on the line 24, FIG. 1).

Assume now, however, that the raw limit variable signal on the line 46 is negative. This will result from a negative track error signal on the line 33 (FIG. 1) indicating that the actuator is lagging the model (has a slower rate than the nominal rate of the model). In this circumstance, the negative raw limit variable signal on the line 46 will again be inverted by the amplifier 72 to provide a positive signal on the line 72. This will cause a negative signal on the line 75, equal to the raw limit variable signal on the line 46, thereby driving the reference point 63 more negative so that lower voltages on the line 44 will overcome the Zener diode 61 and cause it to conduct. When the signal on the line 75 becomes sufficiently negative, however, the reverse conduction potential for the Zener diode 79 will be exceeded (assuming it to be the same potential as that of the Zener diode 78) and, with the not pilot override switch present on the line 50, forward conduction through the diode 78, reverse conduction through the diode 79 and conduction through the switch 81 will cause a limit in the voltage across the resistor 76 and thereby clamp the output on the line 75 to a desired value, which is a voltage equal to −5% of full authority per second, in the example herein. Thus the cicuitry 72–81 will allow increasing or decreasing the positive nominal limit by up to some desired fraction thereof, such as half in the example herein.

Consider the case when the pilot pushes on the stick in an excess of the threshold amount, indicating that the pilot is overriding the trim system. As described with respect to FIG. 1, this will cause the not pilot override signal on the line 50 to disappear, so that the switch 81 will now be open. In such a case, the actuator 16 will invariably tend to lag the model, meaning that the track error on the line 33 (for increasing position commands on the line 24) will be negative. This means that the raw limit variable signal on the line 46 will be negative, causing a positive input on the line 73 to the amplifier 74 and thus a negative signal on the line 75. But in this case, the switch 81 is open so that the reverse conduction potential of both the diodes 79 and 80 must be accumulatively overcome (the summation of their reverse conduction voltages) before the diodes 78–80 can short circuit the resistor 76. Assuming the Zener diode 80 is chosen to have the same breakdown potential as the Zener diodes 78, 79 (half that of the Zener diode 61), the signal on the line 75 can become as negative as the breakdown potential of the Zener diode 61, so that any positive signal (near zero volts) could cause breakdown of the Zener diode 61; this effectively causes complete limiting of the rate limited error signal on the line 44, to zero volts. Thus, if the track error signal is large enough when the pilot overrides the system, the rate limited error signal on the line 44 can be held to as low a value as zero, so that the output of the integrating amplifier 45 will in a sense remain constant, and any motion of the actuator 16 will therefore be able to reduce the track error signal on the line 33. That is, the model can be held static to allow the actuator to catch up during pilot override. In a normal case, the pilot may not completely override the actuator, and thus the nominal limit may be reduced to some small value other than zero, as necessary.

Consider the case where the command is negative and the raw limit variable signal on the line 46 is negative. This is just the inverse of the situation where both the command is positive and the raw limit variable is positive: that is, it indicates that the actuator is leading the model due to light loading on the actuator compared to nominal. In such a case, a negative raw limit variable signal on the line 46 causes a positive signal on the line 73 at the inverting input of an amplifier 90 so that there will be a negative signal on the amplifier output line 91. The negative signal will be of a magnitude related to the raw limit variable unless it exceeds the desired negative variable limit. Driving the reference point 67 more negative means that the rate limited error signals on the line 44 will be more negative before causing reverse conduction of the Zener diode 65. Assuming a Zener diode 92 to have a reverse conduction voltage which is half of that of the Zener diode 65 (e.g., equivalent to 5% of authority per second), when the signal on line 91 exceeds this threshold, the Zener diode 92 will conduct and the Zener diode 93 together with a Zener diode 94 and/or a switch 95 will similarly conduct, thereby limiting the feedback voltage, to a resistor 96, to that which will cause the inverter 90 to provide a negative signal equivalent to increasing the negative limit by half of the nominal negative limit (in the example herein). In a similar fashion, if the model error signal on the line 42 is negative, indicating increasingly negative position commands, and the raw limit variable signal on the line 46 is positive, this indicates that the actuator is lagging the model in its negative motion, so the model should be decreased (in the negative direction). Therefore, a positive raw limit variable signal on the line 46 will cause a negative signal at the input to the amplifier 90 resulting in a positive signal on the amplifier output line 91.

This drives the reference point 67 more positive so that rate limited error signals on the line 44 of a lesser negative value with respect to the positive reference point 67 will exceed the reverse conduction threshold of the Zener diode 65. When the signal line 91 becomes sufficiently positive to exceed the reverse conduction threshold voltage of the Zener diode 93, the Zener diode 92, the Zener diode 93, together with the Zener diode 94 and/or the switch 95 will conduct limiting the feedback voltage to that which will provide a voltage on the line 91 equivalent to the reverse conduction threshold of the Zener diode 93, such as a rate of −5% of authority per second in the example herein. But if the switch 95 is opened by the absence of the not pilot override signal on the line 50, then twice as much reverse bias is required to operate both the Zener diodes 93, 94 in series before limiting the voltage on the line 91. And if both these Zener diodes have a reverse conduction threshold which is half of that of the Zener diode 65, this means that the reference point 67 can become equally positive as the reverse conduction threshold of the Zener diode 65, so that negative signals of even the least magnitude will cause conduction of the Zener diode 65. Thus, with pilot override, the magnitude of the raw limit variable signal on the line 46 can be utilized up to and including the point of totally limiting the rate limited error signal on the line 44 so that the integrating amplifier 45 (FIG. 1) will have no input and the model will stand still and wait for the actuator to catch up to it, as described hereinbefore, when the pilot has stalled or nearly stalled the actuator 16 by virtue of stick motion.

The adaptive actuator fault detection apparatus illustrated in FIG. 1, including the variable limit circuitry described with respect to FIG. 2, may be implemented in a digital fashion, if desired. In fact, the invention has been implemented in a suitably programmed digitial computer, of the type disclosed in a commonly owned copending application of Murphy and Cleford, Ser. No. 938,583, filed on Aug. 31, 1978, and entitled SELECTIVE DISABLEMENT IN FAIL-OPERATIONAL, FAIL-SAFE MULTI-COMPUTER CONTROL SYSTEM, now U.S. Pat. No. 4,270,168. In that application, a pair of identical computers are operable in synchronism in a duplex mode, or singly in simplex modes. The invention has been implemented in a single computer configuration; however, it is obviously implementable in a multi-computer configuration.

Figure 3:
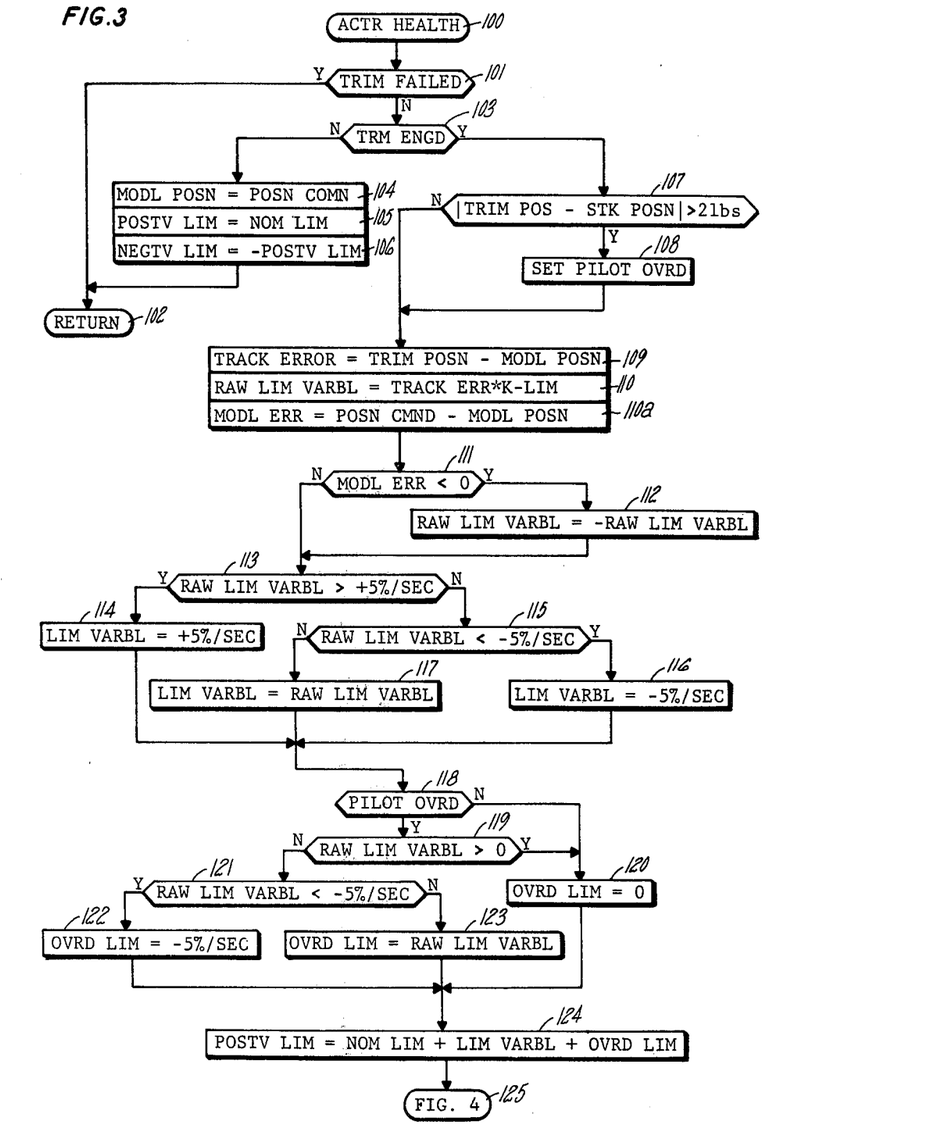
FIGS. 3 and 4 are a simplified, exemplary flow chart of a computer program routine for practicing a digital embodiment of the invention.
Figure 4:
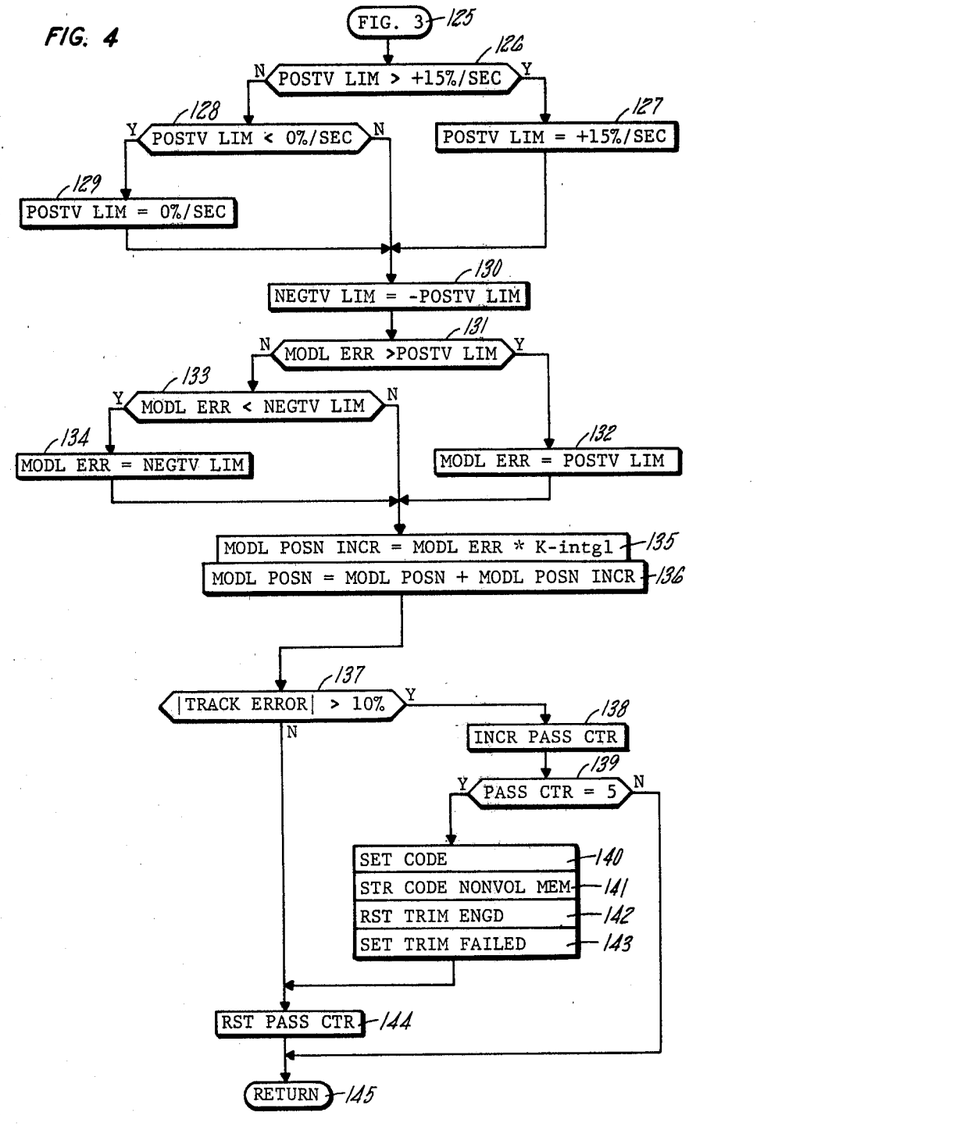

A digital embodiment of the adaptive actuator fault detection of the present invention may be implemented in accordance with computer program routines illustrated in a simplified fashion in FIGS. 3 and 4. In FIG. 3, an actuator health routine is reached through an entry point 100 and a first test determines if the trim system (that is, the system which operates and controls the actuator 16, FIG. 1) has failed. If it has, a test 101 will be affirmative and the actuator helath routine will be bypassed through a return point 102, which will lead the computer to continue with other program routines not related to actuator health. But if the trim system has not failed, a negative result of test 101 will lead to a test 103 which determines if the trim system is engaged. If it is not, a step 104 will set a model position value (equivalent to the output of the model on line 31, FIG. 1) equal to the position command (the input on line 24, FIG. 1). A step 105 will set a positive limit value equal to the nominal limit value (such as a nominal actuator rate limit of +10% of full actuator authority per second), and a step 106 will set a negative limit value equal to the inverse of the positive limit value. The steps 104–106 thereby cause the actuator health routine to be continuously initialized with nominal rate limits and an accumulated model position equal to the current position command. Thus, when trim becomes engaged, the model will be starting with the same input as the actuator and with nominal limits.

Once the trim system has been engaged, provided the system does not fail as described hereinafter, each pass through the computer program (such as once every 50 milliseconds in a major computer cycle) will reach the entry point 100, test 101 will be negative and test 103 will be affirmative so that the actuator health routine will actually be performed.

In FIG. 3, a test 107 determines if the absolute value of the difference between the stick position and the trim position is greater than two pounds; if it is a step 108 sets a pilot override flag. This is equivalent to the function of the summing junction 53 and window comparator 51 in FIG. 1. Then, a step 109 provides the track error value as the difference between the trim position and the model position, equivalent to the summing junction 32 in FIG. 1. A step 110 establishes the raw limit variable as the track error times an amplification factor, which is equivalent to the amplifier 47, FIG. 1. Then, a step 110a generates a model error value equal to the difference between the position command and the model position, equivalent to the summing junction 41, FIG. 1.

In the digital embodiment descried in FIGS. 3 and 4, a single variable limit is provided, to be added or subtracted to the nominal limit, equivalent to the first quadrant (that is the positive limits effective against the positive model errors, as illustrated in FIGS. 1 and 2), which performs the function of the amplifier 74 and its related circuitry in FIG. 2. This is achieved in the digital embodiment by determining if the model error is negative, and if it is, reversing the sign of the raw limit value variable. This provides the raw limit variable which is unchanged if the model error is positive, and if the model error is negative, will have the same sign relationship to it as if the model error was positive. Thus, the raw limit variable can be utilized to generate the variable limits (as in FIG. 2) as if the model error were positive, and then reconverted so as to provide a fourth quadrant limiter if the model error is negative. For this purpose, a test 111 in FIG. 3 determines whether the model error is less than zero. If it is, a step 112 reverses the sign of the raw limit variable. The the basic variable limit (depending only on whether the track error indicates that the actuator leads or lags the model) is developed beginning with a test 113 which determines if the raw limit variable is greater than +5% per second. If it is, a step 114 provides a limit variable equal to an actuator rate of +5% of full authority per second. But if test 113 is negative, then a test 115 determines if the raw limit variable is more negative than an actuator rate of −5% of full actuator authority per second. If it is, a step 116 generates a limit variable equal to an actuator rate of −5% of full authority per second. But if both tests 113 and 115 are negative, a step 117 generates a limit variable equal to the raw limit variable.

In FIG. 3, the next function is to determine whether or not additional limiting in the lag direction is desirable because the pilot is overriding the trim system. A test 118 tests the pilot override flag which may have been set in step 108, heretofore. If it is set, the raw limit variable is examined in a test 119 to see if it is in the lead direction (that is, greater than zero, in the single quadrant limit generation being performed in FIG. 3). If it is, an override limit is generated in step 120 which is equal to zero. This covers the situation where, although the pilot is overriding, the actuator is still leading the model, so additional model lag is not required to accommodate actuator slowdown as a function of forces being applied by the pilot to the mechanism. If there is no pilot override, a negative result from test 118 will cause the step 120 to establish an override limit of zero. If test 119 is negative, then a test 121 determines whether the raw limit variable indicates a lag greater than 5% of full actuator authority. If it does, a step 122 generates an override limit signal equal to a lag of 5% of actuator authority per second. But if not, the override limit is generated in a step 123 to be equal to the raw limit variable. The final limit for a single quadrant limiter is generated in FIG. 3 by a step 124 which provides a positive limit value as the summation of the nominal limit, the limit variable provided in one of the steps 114, 116, 117, and the override limit which is provided in one of the steps 120, 122 or 123. These steps therfore generate a limit variable which is some function of track error so long as the net result is not greater than 5% of actuator authority per second, plus an additional override limit in only the lag direction if the pilot is overriding this system, the additional override limit being permitted to be 5% of authority in the lag direction. But, with large track errors, a maximum of 5% lead of 5% lag can occur unless override is occurring, in which case a maximum of 10% lag can occur. In other words, the entire nominal limit can be wiped out causing the signal to be hard limited to zero in the case of a large lag when the pilot is overriding the system.

The actuator health program continues from the bottom of FIG. 3 through a transfer point 125 to the top of FIG. 4. Therein, an additional check on the overall value of the single quadrant limiter is made to ensure that it is between zero and 15%. A test 126 determines if the positive limit exceeds an actuator rate of 15% full authority per second. If it does, the step 127 limits the positive limit to the 15% per second rate. But if a test 126 is negative, a test 128 determines if the positive limit is equal to any negative actuator rate. If it is, the positive limit is set equal to zero (indicated as a rate of zero percent of authority per second) in a step 129. The single quadrant limiter is then converted into a two quadrant limiter, in a step 130, by setting a negative limit value equal to the negative of the positive limit value.

At this point, the actuator health routine of FIGS. 3 and 4 is now ready to apply the limits. In FIG. 4, a test 131 determines if the model error exceeds the positive limit (which is the composite variable limit generated in FIG. 3). If it does, a step 132 sets the model error equal to the positive limit. If not, a test 133 determines if the model error is more negative than the negative limit. If so, a step 134 sets the model error equal to the negative limit. But if test 133 is negative, a model error is left as is, since it does not exceed the appropriate limit (either positive or negative, depending on whether the model error is either positive or negative). The steps 132 and 134 are equivalent to the action of the Zener diodes 61 and 65 in FIG. 2, respectively, the actual values of those limits established in FIG. 3 being equivalent to varying the potential of the reference point 63, 67 so as to vary the limit from nominal.

Once the limited model error value is generated (which in FIG. 4 is simply the model error value after tests 131 and 133 have been reached and steps 132 and 134 may have been reached, depending upon the value), the function of the integrating amplifier 45 in FIG. 1 is performed. Step 135 provides a model position increment which is the limited model error times a suitable amplification factor, equivalent to that of the integrating amplifier 45 in FIG. 1. Step 136 adds that increment to the previously accumulated value of model position, in the well known piece-wise integration fashion. Of course, the values can have constants established so as to cause increments bearing a temporal integration relationship to real time, so as to cause tracking of the model in a fashion similar to the rate of advance of the actuator 16 (FIG. 1).

In FIG. 4, the next functions are determining whether or not the actuator is determined to have a fault. A test 137 determines if the absolute value of the track error (as determined utilizing model position provided in the previous cycle, in step 109, FIG. 3) exceeds some threshold value, such as 10% of full authority (in contrast with the rates utilized in limiting, hereinbefore). This test employs the usual convention that the authority of a control stick is taken as ±50%, depending upon the direction, the full authority being from −50% through null to +50%. Thus, test 137 will be affirmative if the track error exceeds 10% of full authority in either direction. This is equivalent to the function of the window comparator 34 (FIG. 1). An affirmative result from test 137 will cause a step 138 to increment a pass counter, and a test 139 will determine if the pass counter has reached a count of five or not. This is equivalent to the utilization of the delay 36 and the AND circuit 37 in FIG. 1 herein. In other words, if the error persists for five cycles (equivalent to about 250 milliseconds), it is deemed not to be created as a result of signal noise, nor as a result of erratic actuator operation as it overcomes static friction during start up, or the like. An affirmative result from test 139 will cause a code to be set and stored into a non-volatile memory location in steps 140 and 141, which is the equivalent to providing a fault signal on the line 40. A step 142 will reset the trim engaged flag, which is interrogated in test 103. And, a step 143 will set the trim failed flag, which is equivalent to the function of the flip-flop 26 in FIG. 1. Then, a step 144 will reset the pass counter, which will also be done whenever the track error is not excessive, as determined by a negative result of step 137, and other parts of the computer program can be reached through a return point 145. Whenever test 139 is negative, indicating that there has been fewer than five cycles with an excessive error, the steps 140–144 are bypassed and other parts of the program are reached through the return point 145.

In the exemplary digital embodiment of FIG. 3, as is inherent in any feedback system being performed digitally, it is necessary to use one value or another which is generated in a preceding cycle in order to determine something in a current cycle. As alluded to briefly hereinbefore, a new track error value is generated in step 109 and a new model error is generated in step 110 which, however, requires use of a previously determined model position in step 110a. On the other hand, if the model error were not determined until after step 136 in FIG. 4, it could use an up-to-date model position generated in this cycle. But in that case, the sign of the model error which is tested in test 111 would be the sign in the previously determined model error. And in the present example, the track error test in step 137 of FIG. 4 utilizes a track error generated in step 109 which includes the previous model position as well. However, this in not critical, particularly where a pass counter is utilized on the error.

There are various other ways in which the digital embodiment could be varied. For instance, with additional programming, it would be possible to generate the two quadrant limiter variable limits wholly independently in each case. Or, test could be made to determine which limiter (a first quadrant limiter or a third quadrant limiter) would be necessary in dependence on whether the model error were positive or negative, and generate the limit value variables only for that particular quadrant. And various combinations of these could of course be employed if desired. The details of the exact programming depend on the style of programming utilized, which in turn is dependent on computer architecture and availabe storage space, time constraints and the like, as is well known in the art. Thus, in an implementation of the invention which has been achieved and is described hereinbefore, there are variations in the programming to suit computer architectural and programming needs which, however, are not apparent at the level of flowchart utilized in FIGS. 3 and 4 to explain the invention, and which mask an understanding thereof. These details do not themselves form any part of the invention, and are irrelevant.

From the digital and analog embodiments of the invention described herein, it should be apparent that the invention provides a model which generates a model position for comparison with a trim actuator position, the model being adaptive, in dependence on whether the actuator leads or lags the model and whether pilot override is employed. The leading and lagging determines whether greater or lesser limitation is to be used and the override allows a further limitation to account for heavy loading of the actuator by the pilot forces on the stick (or pedals, as the case may be).

Notice that a fault is taken to be a difference in position which exceeds some threshold amount, such as 10% of authority. The adaptive fault detection is adaptive only with respect to rate of change of position, since the limits govern the magnitude of increments which are integrated in the model. Thus, if the track error is such that the actuator either leads or lags the model, with the model limit established at the maximum or minimum, respectively, after a period of time the positional difference of the error signal will be sufficient to manifest a fault.

The foregoing is a description of the improved adaptive aircraft actuator fault detection apparatus of the invention, which provides additional rate limiting in the model whenever the pilot introduces more than a threshold amount of force on the actuator by operation of the pilot controls. An analog adaptive actuator fault detection apparatus similar to the embodiment of FIG. 2, but not being able to accommodate pilot-loading of the actuator, was heretofore known in the art. That prior device employed forward diode bias limiting to perform the nominal limiting (equivalent to that performed by the Zener diodes 61, 65) and the lead or lag variation in nominal limiting (equivalent to that performed by the Zener diodes 78, 79 and 92, 93). However, that prior apparatus did not include the pilot override functions (such as that provided by the switches 81, 95 and the Zener diodes 80, 94 in FIG. 2 herein). Thus, the present invention, by allowing additional limiting in the lag direction, avoids the creation of nuisance fault indications or the requirement for shutdown of the detection system or other degradation or performance, as a consequence of pilot inputs.

Although the invention has been shown and described with respect to exemplary embodiments thereof, it should be understood by those skilled in the art that various changes, omissions and additions may be made therein and thereto, without departing from the spirit and the scope of the invention.

I claim:

1. An adaptive aircraft actuator fault detection apparatus comprising:

a mechanism for positioning a control surface of the aircraft, said mechanism including a pilot control member movable by the pilot to position said surface;

an actuator resiliently connected to said mechanism and being positionable in response to a position error signal applied thereto to determine the position of said mechanism which will have zero force applied thereto by said resilient connection;

a position detector connected to said actuator for providing a trim position signal indicative of the position of said actuator; and signal processing means for providing a position command signal, for providing a position error signal to said actuator as the difference between said position command signal and said trim position signal, for presenting a model position signal, for providing a track error signal as the difference between said trim position signal and said model position signal, for providing a model error signal as the difference between said position command signal and said model position signal, for providing said model position signal as the integral of said model error signal to the extent that said model error signal does not exceed a limit, said limit being a nominal limit which is varied by a limited portion of said track error signal, said limit being increased in the case where said track error signal indicates that the model position is leading the actuator position and being decreased when said track error signal indicates that the model position is lagging the actuator position, and for providing a fault indication signal in response to said track error signal exceeding a threshold magnitude;

characterized by:

means associated with said signal processing means and responsive to said mechanism for providing a pilot override signal when the pilot is forcing said mechanism away from said trim position by more than a predetermined threshold amount, and said signal processing means provides said model position signal as the integral of said model error signal limited to an amount which is further reduced by a limited portion of said track error signal, in response to said pilot override signal when said track error signal indicates that the actuator position is lagging the model position.

2. An adaptive aircraft actuator fault detection apparatus according to claim 1 further characterized by said signal processing means reducing said limit to zero in response to said override signal when said track error signal indicates that the actuator position lags the model position by a predetermined amount.

* * * * *